Oct. 30, 1928.

W. FINK 1,689,868

MACHINE FOR WASHING FRUITS AND VEGETABLES

Filed June 17, 1925

Witnesses:
Hans Hein
Hans Seifert

Inventor:
Wilhelm Fink.

Patented Oct. 30, 1928.

1,689,868

UNITED STATES PATENT OFFICE.

WILHELM FINK, OF BONN-ON-THE-RHINE, GERMANY.

MACHINE FOR WASHING FRUITS AND VEGETABLES.

Application filed June 17, 1925, Serial No. 37,839, and in Germany October 9, 1924.

The machine is of that type in which a sieve-trough with a rotatable wing-shaft or a rotatable sieve-drum is placed in a tank adapted to contain washing-fluid for fruits and vegetables.

When the above said substances are washed, it is not difficult to remove sand, earth, and like impurities, because they sink to the bottom of the washing-tank; but it is very difficult to get rid of lighter impurities, such as particles of grass, leaves, needles of fir trees, moss and the like substances, because they float on the surface of the fluid together with the material to be treated. The machine according to this invention executes this work in a simple but perfect and very economical manner. In the accompanying drawing which represents the new machine:

Figs. 3 and 4 represent a modified form of the new machine.

Figure 1:
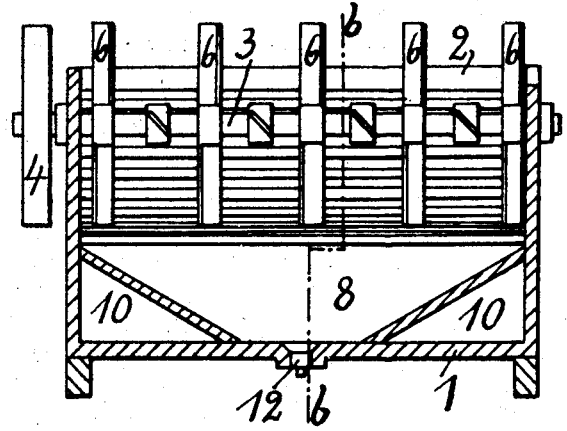
Fig. 1 is a longitudinal section on line $a-a$ in Fig. 2.

The tank 1 is adapted to contain liquid for treating fruits as above mentioned. Within the tank is placed a sieve-trough 2, in which is mounted a shaft 3, which can be rotated by a pulley 4 or any other suitable contrivance, in the direction of arrow 5. On the shaft 3 are fixed wings 6, the blades of which are made oblique, in order to move the treated material forward in axial direction. Instead of a wing-shaft may be used any other contrivance which is suitable to agitate the fluid and material to be treated. Underneath the sieve-trough, the tank 1 is divided into compartments 7, 8, 9. The outer situated compartments 7 and 9 communicate by channels 10, of which one or more may be used according to the length of the machine. The channels 10 may be shaped and arranged in any suitable manner. In the compartment 9 is placed a sieve 11, in horizontal or inclined position, the latter position being preferable in order to obtain a larger sieve-surface.

When the tank 1 is filled with fluid and the shaft 3 set in motion, the wings 6 act both as propellers and paddle-wheels. The fluid and the material to be cleaned are agitated by the wings, by which action all impurities are washed off from the material. Sand and the like impurities fall down through the sieve-trough to the bottom of the compartment 8, in which they are separated from the circulating fluid-current as described below. The sediments accumulated in the compartment 8, can be removed periodically by a valve 12 or some equivalent. By the propelling action of the wings 6, the material to be cleaned will be driven to the end of the machine, where it will be delivered. In the same time, the fluid will be driven by the action of the wings, across the sieve-trough, by which movement the surface of the fluid will be lowered in the compartment 7 and raised in the compartment 9. The result of the difference in height of surface is a constant circulation of the fluid through the channels 10 in the direction of the arrows 13, as long as the wing-shaft is in rotating motion. The flowing movement of the fluid causes all floating impurities, which may pass through the holes of the sieve-wall to go into the compartment 9, from where they flow off through the sluice-way 14. Such impurities which are drawn down by the draft of fluid within the compartment 9, will be retained by the sieve 11, through which the fluid is caused to pass by its circulating movement. In this way the fluid is automatically freed from all impurities, and enters on the opposite side of the sieve-trough practically thoroughly cleaned. The sieve 11 may be placed in any suitable manner to enable it to retain the impurities from the circulating fluid. The fluid discharged by overflow thru the sluice-way, may be supplied in any suitable manner.

Figure 2:
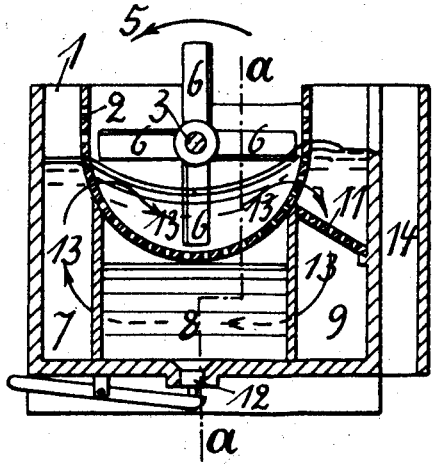
Fig. 2 is a transverse section on line $b-b$ in Fig. 1.
Figure 3:
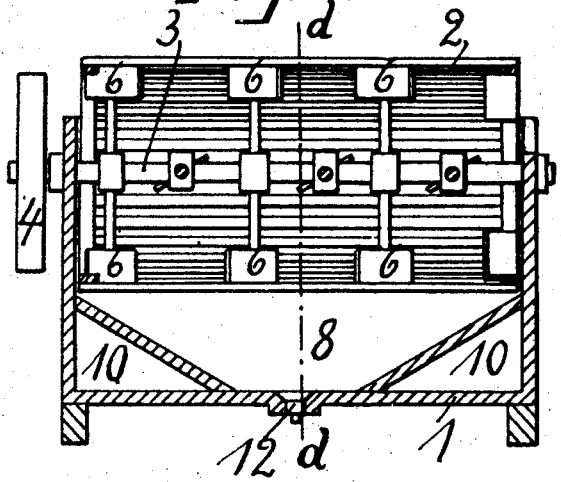
Fig. 3 is a longitudinal section on line $c-c$ in Fig. 4.
Figure 4:
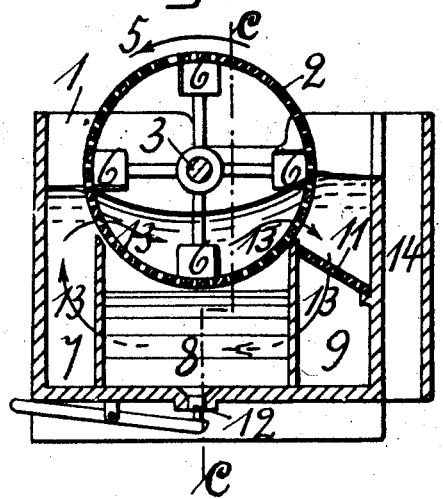
Fig. 4 is a transverse section on line $d-d$ in Fig. 3.

In the modified form of the machine, represented by Figs. 3 and 4, instead of a sieve-trough is mounted a sieve-drum 2 on the shaft 3, which can be rotated by a pulley 4, in the same manner as the wing-shaft in Figs. 1 and 2. The drum 2 on the inside is fitted with obliquely mounted blades 6 which act in the same manner as the wings in Figs. 1 and 2. The construction, operation and use of the form of the machine represented by Figs. 3 and 4 and the combination of the several parts of it, are the same as in Figs. 1 and 2 and they form part of the present application, wherein like reference characters designate similar parts in the several views.

Having thus described my invention, what I claim, and desire to secure by Letters Patent is:

A machine for washing fruits, vegetables and the like, consisting of a tank adapted to contain washing fluid, sieve means and rotatable agitator means therein adapted to contain and agitate the objects to be washed mounted in the upper portion of said tank, vertical partitions parallel to axis of said rotatable agitator dividing the lower portion of said tank into compartments, said tank being provided with a passage permitting a flow of said washing fluid from one outermost compartment to the other and a sieve interposed in the path of fluid flow caused by the rotation of said rotatable agitator.

WILHELM FINK.